H. KELLER, DEC'D.
K. KELLER, ADMINISTRATRIX.
COMPOSITE GEAR WHEEL.
APPLICATION FILED MAY 13, 1921.

1,383,816.

Patented July 5, 1921.

Inventor:
Huldreich Keller,
deceased.

UNITED STATES PATENT OFFICE.

HULDREICH KELLER, DECEASED, LATE OF ZURICH, SWITZERLAND, BY KATHARINA KELLER, ADMINISTRATRIX, OF ZURICH, SWITZERLAND, ASSIGNOR TO THE FIRM AKTIENGESELLSCHAFT DER MASCHINENFABRIKEN ESCHER WYSS & CIE., OF ZURICH, SWITZERLAND.

COMPOSITE GEAR-WHEEL.

1,383,816.      Specification of Letters Patent.      Patented July 5, 1921.

Application filed May 13, 1921. Serial No. 469,299.

*To all whom it may concern:*

Be it known that I, KATHARINA KELLER, née HAUSAMMANN, a citizen of the Republic of Switzerland, residing at Zurich, Switzerland, administratrix of the estate of HULDREICH KELLER, late a citizen of the Republic of Switzerland, deceased, who has invented certain new and useful Improvements in Composite Gear-Wheels, do hereby declare the following to be a clear, full, and exact description of the invention, such as will enable others skilled in the art to which it appertains to make and use the same, reference being had to the accompanying drawings, and to letters or figures of reference marked thereon, which form a part of this specification.

This invention relates to improvements in gear wheels and consists in an improved design of a composite gear wheel of the type disclosed in my application Ser. No. 421,780 dated Nov. 4th, 1920. In this application it has been proposed to provide the inserted elastic ring and the pressure surfaces of the toothed rim and of the wheel body co-acting with said ring of a cylindrical shape. In contradistinction thereto a composite gear wheel built according to the present invention consists of a wheel body or disk provided with a rim the meridian section of which is of U-shape open to the outer side, the elastic ring which has an outer cylindrical face being inserted between the shanks of the U-shaped rim of said wheel body and the metallic toothed rim being shrunk to the elastic ring. If the whole inserted ring were to be made of a comparatively soft material, for instance of soft rubber, the danger exists that the metallic, cylindrically bored toothed rim on being brought in position would shove the outer layer of the soft ring in front of it and cause it to jam or bulge and thus prevent the metallic ring from being pressed into the proper position. This drawback might be overcome by increasing the bore of the toothed rim to a comparatively large dimension; however, in this case the ring would not exert the desired shrinkage strain when getting cold, so that the frictional action in the direction of the circumference might be too small in order to enable the wheel to transmit the desired circumferential pressure or power. On the other hand if the bore of the toothed rim were to be made sufficiently small and if the rim were to be heated up to a very high degree for the purpose of providing for a sufficient radial clearance for placing the rim onto the elastic ring, the danger exists that at least the outer layer of the elastic ring could be detrimentally influenced by the excessive heat. These disadvantages are avoided according to the present invention. As the outermost layer of the elastic ring consists of a harder (but yet elastic) material, it imparts a certain stiffness to the ring at its circumference, so that a jamming or bulging of the ring material in the axial direction is prevented even when the metallic toothed rim produces a certain amount of friction when being shrunk onto the ring. In this case the toothed rim does not have to be made of such a small shrinkage dimension and does not need to be heated to such a high degree as when no such stiffening layer is provided. Thereby any damaging of the inserted elastic ring by the action of the heat is excluded and the toothed rim can exert nevertheless a great shrinkage strain so that it is well adapted to transmit a great circumferential power.

In order to prevent this outer layer from having a bad effect on the compressibility of the elastic ring in the radial direction and on its total elasticity, the outermost hard layer may be subdivided at its circumference for instance by slots to or cuts extending in a radial direction and in directions parallel or at an angle to the axis of the ring.

One constructional example of the invention is illustrated on the accompanying drawing, in which.

Figure 1:
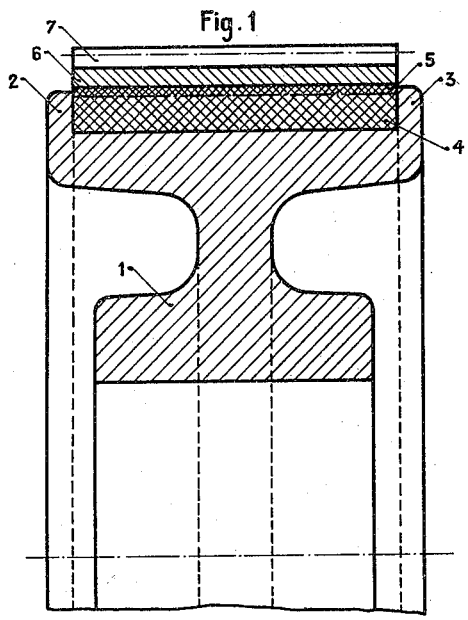
Figure 1 shows the upper half of a meridian section through a toothed wheel according to the invention.
Figure 2:
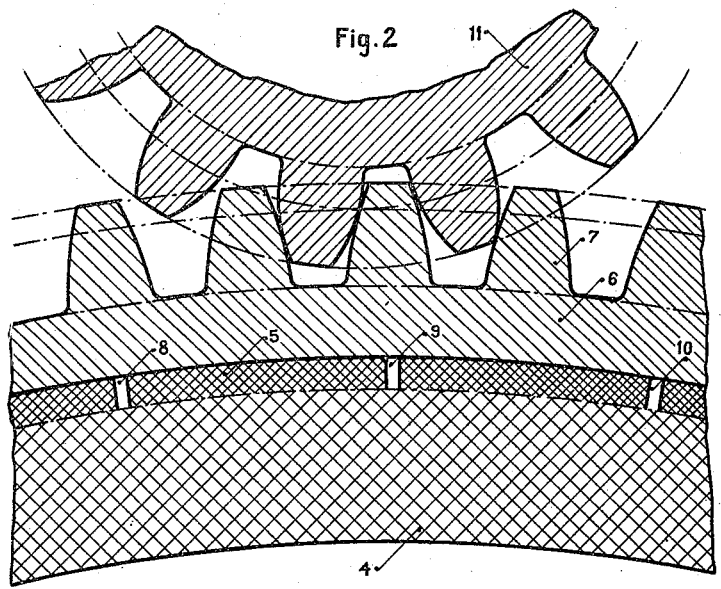
Fig. 2 illustrates on a larger scale part of a side view of a toothed rim, provided with the elastic ring, and a pinion engaging with the toothed rim.

The wheel disk 1 of the large, driven, toothed wheel is, seen in a meridian section, of a U-shape open to the outer side with the shanks 2 and 3. Into this U-shape a layer 4 of soft rubber is inserted first and then above it a layer 5 of hard rubber. The outer face of the layer of hard rubber is very accurately ground to a cylindrical shape of a definite diameter. The metallic rim 6 containing the teeth 7 is provided with a bore the diameter of which is slightly smaller than the outer diameter to which the layer 5 of hard rubber has been ground. For the purpose of shrinking, the toothed rim 6 is heated to a sufficiently high temperature and then pushed in an axial direction onto the layer 5 of hard rubber. The latter is of such a stiffness that the toothed rim 6 may rub a good deal when being put on without causing a jamming or bulging of the inserted ring in front of the rim 6 and thereby preventing a further movement of the latter into the desired position. In order to permit the toothed rim 6 to press sufficiently onto the inner layer 4 of soft rubber after the rim has cooled down, the outer layer of rubber is slotted in a radial and in an axial direction at the points 8, 9 and 10. The toothed rim 6 after having cooled exerts such a great radial pressure on the layer 5 of hard rubber, the ring 4 of soft rubber and the wheel disk 1 that the friction thereby produced suffices to transmit the circumferential power from the pinion 11 to the shaft of the large wheel without causing any gliding movement between the toothed rim 6 and the wheel disk 1.

The shanks 2 and 3 are so dimensioned in the radial direction, that they nearly extend to the toothed rim 6 (Fig. 1) and form the lateral walls for confining the rubber insertions 4 and 5. By this means upon the shrinking of the toothed rim 6 the soft rubber ring 4 is prevented from bulging laterally and does not take up the necessary radial pressure or prevent the latter from being exerted in the desired degree.

I claim:

1. A composite gear wheel, comprising a wheel body provided with a rim the meridian section of which is of U-shape open toward the outer side, a ring consisting of an elastic material inserted between the shanks of the U-shaped rim of said wheel body and provided with a cylindrical circumference, and a rigid toothed rim shrunk onto said elastic ring.

2. A composite gear wheel, comprising a wheel body provided with a rim the meridian section of which is of U-shape open toward the outer side, a ring consisting of an elastic material inserted between the shanks of the U-shaped rim of said wheel body, the outermost layer of said ring consisting of a harder material than the other part of the ring and being provided with a cylindrical circumference, and a rigid toothed rim shrunk onto said elastic ring.

3. A composite gear wheel, comprising a wheel body provided with a rim the meridian section of which is of a U-shape open toward the outer side, a ring consisting of an elastic material inserted between the shanks of the U-shaped rim of said wheel body, the outermost comparatively thin layer of said ring consisting of hard rubber and the bulk of the ring consisting of soft rubber, a cylindrical circumference being provided on said ring, and a metallic toothed rim shrunk onto said elastic ring.

4. A composite gear wheel, comprising a wheel body provided with a rim the meridian section of which is of U-shape open toward the outer side, a ring consisting of an elastic material inserted between the shanks of the U-shaped rim of said wheel body, the outermost layer of said ring consisting of a harder material than the other part of the ring and being repeatedly subdivided along its cylindrical circumference, and a rigid toothed rim shrunk onto said elastic ring.

In testimony that I claim the foregoing as the invention of the said HULDREICH KELLER, I have signed my name.

FRAU KATHARINA KELLER,
*Administratrix of Huldreich Keller, deceased.*